L. S. BACHE.
THRUST BEARING.
APPLICATION FILED JULY 31, 1915.
1,184,406.
Patented May 23, 1916.
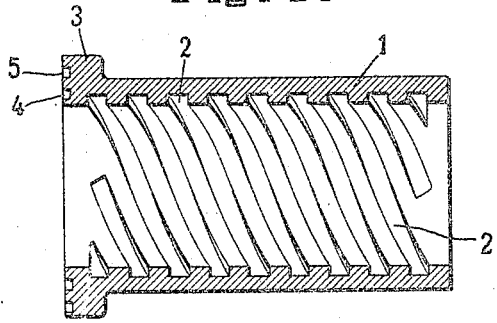
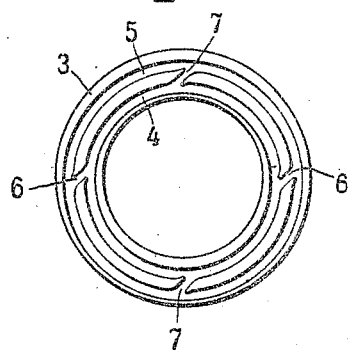
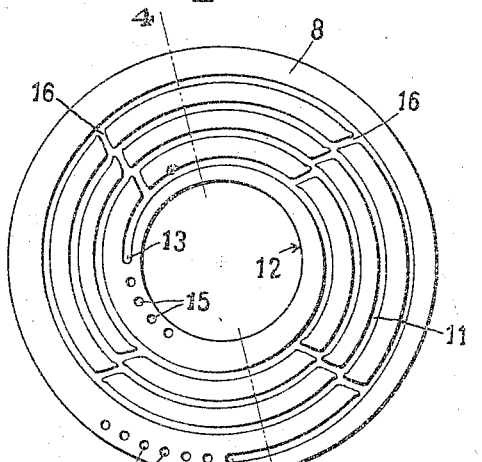
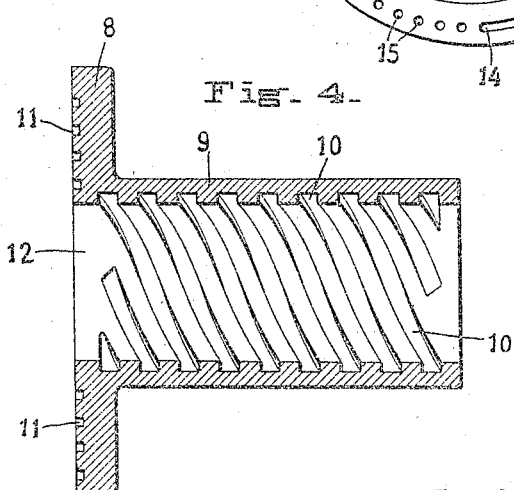
Witnesses:
Inventor
Leigh S. Bache,
By his Attorney

UNITED STATES PATENT OFFICE.

LEIGH S. BACHE, OF MIDDLESEX, NEW JERSEY, ASSIGNOR TO GRAPHITE LUBRICATING COMPANY, OF BOUNDBROOK, NEW JERSEY, A CORPORATION OF NEW JERSEY.

THRUST-BEARING.

1,184,406.   Specification of Letters Patent.   Patented May 23, 1916.

Original application filed March 17, 1914, Serial No. 825,357. Divided and this application filed July 31, 1915. Serial No. 43,036.

*To all whom it may concern:*

Be it known that I, LEIGH S. BACHE, a citizen of the United States, and a resident of Middlesex, in the county of Middlesex and State of New Jersey, have invented certain new and useful Improvements in Thrust-Bearings, of which the following is a full, clear, and exact description, whereby any one skilled in the art may make and use the same.

The invention relates to bearings and more particularly to a thrust bearing of the self-lubricating type, that is, one which does not require oil but in which oil may be employed without deleterious effects.

It relates more especially to a thrust bearing having a self-lubricating sleeve for maintaining alinement of the shaft upon which the thrust may occur.

The self-lubricating bearing hereinafter described relates to the class of bearings formed in part of metal, preferably bronze, and a lubricating compound inserted in suitable grooves to provide for lubricating the surfaces of the metal shell of the bearing and the bearing members borne thereby. In devices of this character heretofore employed, there has been a tendency for the filling of graphite or other lubricating material to work loose and chip out, particularly where the bearing shells are of comparatively thin material and subject to strain and warpage.

The present invention contemplates a structure in which the thrust portion of the bearing being of peculiar form and correlated to the main portion of the bearing will give adequate lubrication without liability of throwing off the lubricant at the point of greatest duty which may be considered as the thrust end of the bearing. The invention permits of the use of comparatively thin metallic shell portions which are not prohibitive in use and which will provide grooves, under the special arrangement, of adequate capacity for thoroughly lubricating the metallic parts.

Obviously, it is most important to provide for lubricating the entire surface of the metal, particularly in a bearing of the type hereinafter described which provides for end thrust as well as axial conditions.

It is one of the chief objects of the present invention to provide an arrangement of the lubricating material and the metal container so disposed as to give a maximum lubrication to all parts and at the same time, maintaining a maximum of strength for any given size of part. This object is attained and made possible by interlocking the lubricating elements, for that portion receiving the heaviest duty, so that there will be in practice a single unit body of the lubricant interspaced with sustaining portions of metal.

In the drawings, as best showing the features of the invention, there is illustrated a bearing adapted for wind-mills where the vertical shaft must be lubricated and where there is an unusual degree of end thrust. Of course, the invention depicted in the drawings is not limited to a wind-mill bearing and reference thereto is made as indicating the special efficiency of the invention in one form of its application.

In a co-pending application Serial No. 825,357, filed March 17, 1914, there is illustrated and described a thrust washer for use between two moving parts and I make no claim herein to such a thrust washer. The present invention described and claimed is in fact a division of said co-pending application.

Referring to the drawings: Figure 1 is a longitudinal section through the bearing. Fig. 2 is an end view showing the thrust end of the bearing. Fig. 3 is an end view of a modified form of bearing looking at the thrust end. Fig. 4 is a longitudinal section on the line 4—4 of Fig. 3.

In order to provide self-lubricating bearings, such as illustrated, or to provide a bearing effectual as a thrust bearing, great difficulty has been experienced in maintaining shells of sufficiently small dimensions that could hold a sufficient quantity of graphite or lubricating material without said material "throwing off." This condition is particularly true where attempt has been made to use a comparatively small thrust bearing as a separable part in conjunction with a line bearing, as the heats develop and the variations in co-efficient of expansion and contraction between the parts has seriously interfered with holding the lubricating material. Obviously, where in the case of wind-mill bearings or any form of bearing where little attention is given to it, there must be adequate provision for self-lubrication under any and all conditions. It is impossible to satisfactorily employ a type of thrust bearing where the disk is pierced, as the lubricant will work and be displaced. It is also impractical to employ the unusually heavy bearing plates which have always been considered as necessary to hold the lubricant.

The invention herein described contemplates arranging the lubricating material in grooves or recesses at the thrust end of the bearing and interconnecting these recesses with radially disposed channels, both channels and recesses being filled with a lubricating material. The grooves are as shown eccentrically arranged to the axis of the main line bearing so that the lubricant will be wiped over every portion of the metal surface at each revolution and the lubricating material will be thoroughly backed up by solid metal.

Referring to the drawings the numeral 1 indicates the main body of the bearing which is provided with a continuous helical or spiral groove 2 in which, of course, is arranged the graphite or compressed lubricant. The end of the shell 1 is provided with a flange or plate 3. The face of this plate has formed in its grooves 4, 5, (Figs. 1 and 2 showing merely two grooves). These grooves or channels are arranged eccentric to the axial line of the main bearing portion 1 and the metallic walls between the grooves 4 and 5 are broken down forming radial interconnecting channels 6, 7.

It will be obvious that with the grooves and channels filled with a suitable lubricant such, for instance, as graphite, the rotating part bearing thereagainst and rotating concentric with the main line bearing, will carry the lubricant from the eccentric grooves across all the metal portions. This gives a thin film of lubricant for every part of the metal surface. It is quite apparent that, taking any given point upon the metal surface and moving it concentrically of the bearing, it will pass through at least two lines of eccentrically disposed graphite or lubricant. In so doing, it will travel for a considerable distance along the graphite surface. It follows that there is a maximum surface of the graphite available for each moving point of the metal which abuts against the bearing and the metal of the bearing will thereby be lubricated by the carrying over of the film of graphite. Naturally the greatest weight is disposed upon the thrust end of the bearing and the straight line portion is effective in maintaining an even distribution of weight upon the thrust end.

It is apparent that the eccentric groove arrangement permits lubricating the metal clear up to the periphery of the thrust end and to the extreme inner edge of the central bore. It is equally obvious that the rotating parts, instead of crossing directly and abruptly from metal to graphite and from graphite back to metal, glides smoothly along a field of the graphite and then on to the metallic field with a wiping or sweeping action which has no tendency to misplace the graphite.

The eccentric grooves in themselves would not necessarily provide the full advantage which is attained by forming the channels 7. As the speed of the rotating part adjacent to the central bore is comparatively less than the peripheral speed at the exterior of the thrust portion of the bearing, it is apparent that confined grooves of lubricant would be subject to different conditions of friction.

By providing the interconnecting radial channels, a direct contact of lubricant is secured throughout the surface and therefore the heat which may be developed is evenly distributed throughout the mass of lubricating material. This is effective in preventing warpage and throwing of the graphite. Of course, the central bore is adequately lubricated through the grooves 2 and the shell being made in a single piece, gives a substantially uniform heat condition for all of the lubricating material of the bearing.

In Figs. 3 and 4, there is shown a modified arrangement in which an eccentric spiral groove is employed. The thrust end 8 is formed in extension of a central shell 9, the latter provided with a continuous spiral groove 10. The thrust end 8 has a spiral groove 11, beginning adjacent to the central bore 12, as at 13 and terminating adjacent to the outer periphery of the disk as at 14. In continuation of this spiral groove and arranged at both ends thereof are isolated pockets 15, which serve to lubricate the extreme inner surface and extreme outer surface of the thrust end without unduly weakening the metallic structure. The spiral eccentric groove 11 is joined throughout its convolutions by radial channels 16, which are effective in joining the entire mass of lubricant contained in the various convolutions of the groove. This gives in substance the same result and effect as is attained in the juncture of the series of concentric eccentric grooves illustrated in Figs. 1 and 2. The same object and advantage is attained, namely, the uniting of the grooves by the channels, firmly cements together the entire body of graphite and incidentally, of course, provides a greater body of lubricant and a larger surface lubrication.

The radial channels break up the metallic portions of the rings into sections and form direct inner grooves for the graphite between the adjacent rings. Therefore, the whole body of graphite may accommodate itself to the comparatively slight displacement of the individual broken sections of the interposed rings of metal.

The thrust end being formed directly in the metallic shell provides features of strength for a thrust and straight line bearing, permits lightness and gives a comparatively uniform heat distribution which is materially advantageous to maintain the most efficient condition of graphite without displacement.

What I claim as my invention and desire to secure by Letters Patent is:

1. A bearing having a central bore and a disk-like member provided with a central opening for the shaft and provided upon its face with lubricating grooves, said grooves being connected by radially disposed channels filled with a lubricant.

2. A bearing having a central bore, lubricating grooves arranged in said bore and a disk-like thrust member provided with a central opening for the shaft and having in its face lubricating grooves, and radially disposed channels connecting the successive grooves, said channels and grooves filled with a lubricant.

3. A bearing having a central bore provided with lubricating grooves, said bearing having at one end a disk-like member, a series of concentric grooves in said member, all eccentrically arranged with reference to the axis of the bearing, a plurality of radial channels connecting the said grooves, said channels and grooves and the grooves of the central bore all filled with a lubricant.

4. A bearing consisting of a shell having an interior lubricating groove, a disk-like member at one end of said shell and formed integrally therewith, a spiral groove formed in the face of said disk-like member and generated from a point eccentric to the axis of the shell, radial channels connecting the convolutions of the spiral groove, said groove and channels and the interior lubricating groove of the shell being filled with a lubricant and the interior lubricating groove of the shell.

5. A bearing consisting of a shell having an interior lubricating groove, a disk-like member at one end of said shell and formed integrally therewith, a spiral groove formed in the face of said disk-like member and generated from a point eccentric to the axis of the shell, radial channels connecting the convolutions of the spiral groove, isolated pockets formed in continuation of the groove at both ends thereof said groove, channels and isolated pockets being filled with a lubricant.

LEIGH S. BACHE.

Witnesses:
S. A. KING,
DORA F. APGAR.